United States Patent [19]
Wurst

[11] Patent Number: 4,834,322
[45] Date of Patent: May 30, 1989

[54] HIGH "G" PROTECTION SYSTEM

[75] Inventor: Stephen G. Wurst, Orange, Calif.

[73] Assignee: Rockwell International Corporation, El Segundo, Calif.

[21] Appl. No.: 175,660

[22] Filed: Mar. 22, 1988

Related U.S. Application Data

[63] Continuation of Ser. No. 865,503, May 20, 1986, abandoned.

[51] Int. Cl.⁴ .................................................. B64D 25/04
[52] U.S. Cl. ............................ 244/122 AG; 280/748; 297/216
[58] Field of Search ............... 244/121, 122; 280/748, 280/751, 753; 297/216, 488, 487, 464, 465, 466, 486

[56] References Cited

U.S. PATENT DOCUMENTS

| | | | |
|---|---|---|---|
| D. 181,275 | 10/1957 | Cooper | 244/122 R |
| 2,379,385 | 6/1945 | Styers | 244/122 R |
| 2,665,120 | 1/1954 | Replogade et al. | 244/122 AG |
| 2,707,087 | 4/1955 | Bradley et al. | 244/122 B |
| 3,271,797 | 9/1966 | Boyce | 244/122 B |
| 3,645,259 | 2/1972 | Schulman | 244/122 AG |
| 3,811,701 | 5/1974 | Grime | 297/488 |
| 4,301,983 | 11/1981 | Horan | 244/122 AG |
| 4,784,352 | 11/1988 | Smith et al. | 244/122 AG |

OTHER PUBLICATIONS

Col. H. M. Sweeney, "Man's Tolerance to very Short Durations of G" 1947, pp. 1, 4, 6, 7, 9.

Primary Examiner—Galen L. Barefoot
Attorney, Agent, or Firm—Charles T. Silberberg

[57] ABSTRACT

A high "g" protection system for a crewmember of an aircraft includes a seat and an upper torso support. The upper torso support is preferably secured to the crewmember's suit and to the seat. The torso support has a support plate and a support member which allow the crewmember to be supported and restrained while in a leaned forward or crouched position while enhancing the crewmember's tolerance to "g" forces. Another embodiment of the invention uses a pair of approximately positioned armrests to provide torso support. The seat is provided with a repositionable seat pan which allows the crewmember's knees to be raised bringing him into a more crouched position or, conversely, allows the crewmember's knees to be lowered reducing the crewmember's angle of crouch, as may be desired.

16 Claims, 5 Drawing Sheets

HIGH "G" PROTECTION SYSTEM

This is a continuation of co-pending application Ser. No. 865,503, filed on May 20, 1986, now abandoned.

BACKGROUND OF THE INVENTION

1. Field of the Invention

This invention relates to restraint systems and seat systems for protecting the crewmembers of an aircraft from high "g" forces resulting from aircraft maneuvers and/or emergency ejections from aircraft.

Modern high performance fighter aircraft are capable of flight maneuvers which subject the crewmembers to very high forces of acceleration. Severe stresses are placed on the crewmembers by such aircraft maneuvers. Indeed, many modern aircraft are capable of aerial maneuvers which are beyond the tolerance of the human crewmembers. Consequently, fighter aircraft and their crewmembers are occasionally lost as a result of pilot blackout.

Aircraft equipment malfunction or adverse environmental conditions may occasionally make proper control of the aircraft so difficult as to render it improbable that the aircraft can be safely landed. Enemy fire in combat situations may seriously disable an aircraft or crewmember making it also improbable that the aircraft can be brought to a safe landing. In such situations, ejection of the crewmembers from the aircraft may be desirable. However, in some such situations, the high forces of acceleration generated by catapult ejection systems may be added to the forces generated by the motion of the aircraft and the total forces may thus exceed the tolerance of the crewmember. Consequently, pilots and their crewmembers are occasionally killed or severely disabled as a result of ejection from an aircraft.

2. Statement of the Prior Art

Many prior art methods of protecting the crewmember from the stresses of "g" forces require that the crewmember be placed in a prone position. This position purportedly allows the crewmember to be better able to tolerate "g" forces to which the crewmember is commonly subjected as a result of many types of aircraft maneuvers. However, this prone position reduces the pilot's visibility and also may make it more awkward for the pilot to operate the controls. In addition, such a position makes it more difficult to safely eject the crewmember in the event of an emergency due to the dimensions of the seat required, and there is an increased probability that the excessive length of the seat will make it more likely that the seat will tumble as a result of the wind blast after ejection. An example of such prior art seating systems in U.S. Pat. No. 2,369,258 to Shebat.

Other prior art seating systems for aircraft provide the capability of altering the seating position (and sometimes the seating position angle as well) of the pilot or crewmember as required for various conditions of flight. Such systems thus place the crewmember in a leaned back position to enhance "g" tolerance in order to perform certain aircraft maneuvers. Such systems also allow the crewmember to be in a nearly upright seated position when flight conditions require the crewmember to have good visibility and improved dexterity in operating the controls. However, the disadvantage with such systems is that powering the seat to so alter its position adds to the complexity of the seating system and its weight; moreover, movement of the seat to a desired position may not be fast enough to accommodate flight requirements, particularly under combat conditions. Another disadvantage with these systems is that they are unable to accommodate many flight conditions where, in many instances, good visibility and "g" protection are required simultaneously. Two examples of such prior art seating systems are U.S. Pat. No. 4,243,024 to Crosby and U.S. Pat. No. 4,004,763 to Bunnell.

Systems which are fixed in the layback position also have the disadvantage that they reduce the pilot's visibility both within and outside the cockpit and sharply decrease the available display panel area. Moreover, many crewmembers instinctively go to an "alert" body position—head erect and torso crouched forward - during the high stress situations where the "g" protection is needed the most. Moreover, studies have shown that crewmembers have a lower tolerance to vibrations, which are typical during high aircraft acceleration, in the supine position. An example of such restraint systems in U.S. Pat. No. 3,329,464 to Barwood.

Other prior art systems for providing protection from "g" forces to the crewmember include strap restraints retaining the pilot or crewmember firmly against the seat. Such prior art systems typically provide restraint to the crewmember while in a supine or erect seated position. Such restraint systems severely limit the degree of movement of the crewmember in the seat.

Some prior art systems use a pad positioned over the chest of the crewmember to apply restraint directly to the crewmember's chest. Although such chest pads tend to spread out the restraint forces over the crewmember's chest, they are functionally essentially the same as and thus no more effective than the restraint systems described hereinabove. Two examples of such prior art restraint systems using chest pads are U.S. Pat. No. 3,524,679 to De Lavenne and U.S. Pat. No. 4,300,799 to Cunningham.

Still other types of prior art systems for protecting crewmembers from "g" forces incorporate suits filled with pressurized air. The pressurized air within the suit exerts pressure at certain areas of the crewmember's body such as the abdomen and legs to prevent the crewmember's blood from pooling in these areas of the body as a result of high "g" forces. The disadvantage with such pressurized suits is that they fail to deal with the problems of compressive forces exerted on the spine by the "g" forces as well as local pressure points located where the crewmember's body contacts the seat. An example of such prior art air pressure suits incorporating automatic pressure regulation therein is U.S. Pat. No. 4,243,024 to Crosbie.

A high "g" protection system is thus needed that will provide protection against compression of the vertebrae of the spine caused by the forces of acceleration as well as generally improve the crewmember's tolerance to the forces of acceleration while allowing for selective crewmember movement, good visibility, safe ejection and good access to the controls.

SUMMARY OF THE INVENTION

It is a principle object of the present invention to provide protection to the crewmember of an aircraft from "g" forces resulting from aircraft maneuvers.

It is an object of the present invention to provide protection to the crewmember of an aircraft from high "g" forces caused by the forces of ejection from the aircraft.

It is another object of the invention to provide a seating system for the crewmember of an aircraft which supports the crewmember in a crouched position.

It is still another object of the present invention to provide a restraint system providing protection from "g" forces while still allowing the crewmember mobility in the seat.

It is another object of the present invention to provide a high "g" protection system which allows the crewmember to retain good visibility of the instrument panel and the surrounding environment and allows him to have good access to the controls.

It is also another object to the present invention to provide a seating system which places the crewmember into a stable position upon ejection from the aircraft to provide protection from windblast.

The system of the present invention is designed to provide protection to a crewmember of an aircraft or other vehicle from "g" forces acting in many directions, but primarily to provide protection from positive "g" forces acting approximately normal to the x-y axes plane of the aircraft or inclined aft from the normal to the x-y axes plane.

Generally, the system includes a seat to which in the preferred embodiment is connected a support for the upper torso of the crewmember. The support is specifically designed to provide support to the crewmember's upper torso when he is in a crouched position. The support includes a support plate which is connected to a support member so a to allow multi-axis rotation of the plate relative to the support member. The connection between the support plate and member is a universal joint, which allows the crewmember freedom to rotate his upper torso, while at the same time limiting the fore and aft, up and down, and side to side translation of the crewmember. However, the support member does have a limited amount of fore and aft travel, which allows the crewmember to lean backward and forward within a certain range; the fore and aft travel is preferably provided by incorporation of a telescoping structure allowing extension of the member. A spring and damping system may be provided within the pedestal (support member) to provide a restoring force that is a function of both the degree and the rate of fore and aft displacement of the crewmember. Since the crewmember is restrained in all axes, conventional shoulder harness and lap belt restraints are not required.

Alternatively, an appropriately positioned pair of armrests may provide support to the crewmember in a crouched over position. The armrests are sufficiently forward of the crewmember's upper torso that his elbows and upper torso center of gravity are approximately in alignment with the "g" force when he is crouched over. Thus, the armrests provide support to the crewmember's upper torso when subjected to high "g" forces of acceleration.

The seat optimally includes a repositionable seat pan. The seat pan automatically elevates the crewmember's knees during ejection preferably by means of a pneumatic bladder under the crewmember's legs. By helping the crewmember maintain a posture in which the upper torso is most nearly perpendicular to the acceleration force, the seat enhances the crewmember's ability to sustain high "g" forces of ejection. During ejection, a pair of cords pulls the crewmember's feet back under his torso thereby placing the crewmember in a generally squatting position; this reduces the crewmember's susceptibility to high speed spin which might otherwise result from a limb catching the windblast.

It is also crucial to note that the leaned forward or crouch position tends to put the crewmember in an aroused or alert state. In contrast, the supine position of prior art systems tends to put the crewmember in a relaxed state. Clearly, it is preferable that the crewmember be in an aroused or alert state during combat situations or high "g" flight maneuvers.

In addition, the leaned forward or crouch position raises the limits of useful consciousness of the crewmember. The limits of useful consciousness "g" tolerance of the crewmember is inversely proportional to the eye to aortic valve hydrostatic column. Thus, when the "g" forces are in alignment with the eye to aortic valve column so as to impede blood flow, the crewmember's limits of useful consciousness "g" tolerance are at a minimum for a given level of "g" forces. Conversely, when the "g" forces are out of such alignment with the hydrostatic column, the crewmember's limits of useful consciousness "g" tolerance are improved. Since the eye to aortic valve column is inclined approximately 24° to 28° forward of the crewmember's spine, the leaned forward position further tilts the hydrostatic column away from the "g" force vector. Moreover, in the crouched position the crewmember may shrug his shoulders with his head erect thereby shortening the eye to aortic valve distance and further enhancing the limits of useful consciousness "g" tolerance. Because it is difficult for a crewmember to "shrink" his neck in a layback position, the crouch position is more effective in this regard than the layback position in expanding the crewmember's limits of useful consciousness "g" tolerance.

Since the crewmember is leaning forward rather than backward, his visibility in the direction of flight is better than with other prior art devices which place the crewmember in a supine position. In addition, more of the display panel is within his field of vision. Moreover, the crewmember's hands are proximal to the instrument panel and he is therefore in a better position to operate the controls and to read the instruments. The crewmember's spine is also aligned in a better position to damp the vibrations normally accompanying high accelerations. Moreover, since the crewmember is in a crouched position upon ejection from the aircraft, the crewmember's spine is not subjected to potentially injurious compression as a result of these ejection forces. Thus, the present invention provides greater protection from the forces of ejection from the aircraft.

The ejection system is of conventional design incorporating a rocket motor mounted on the underside of the seat pan and rails mounted at the back portion of the backrest for guiding the seat out of the aircraft. The rails are tilted aft from the direction of flight in order to provide the optimum ejection trajectory.

DESCRIPTION OF THE PREFERRED EMBODIMENT

Referring now to the drawings, the high "g" protection system of the present invention is generally designated by the numeral 10. A suit 12 is worn by the crewmember of an aircraft or other vehicle (not shown).

Figure 6:
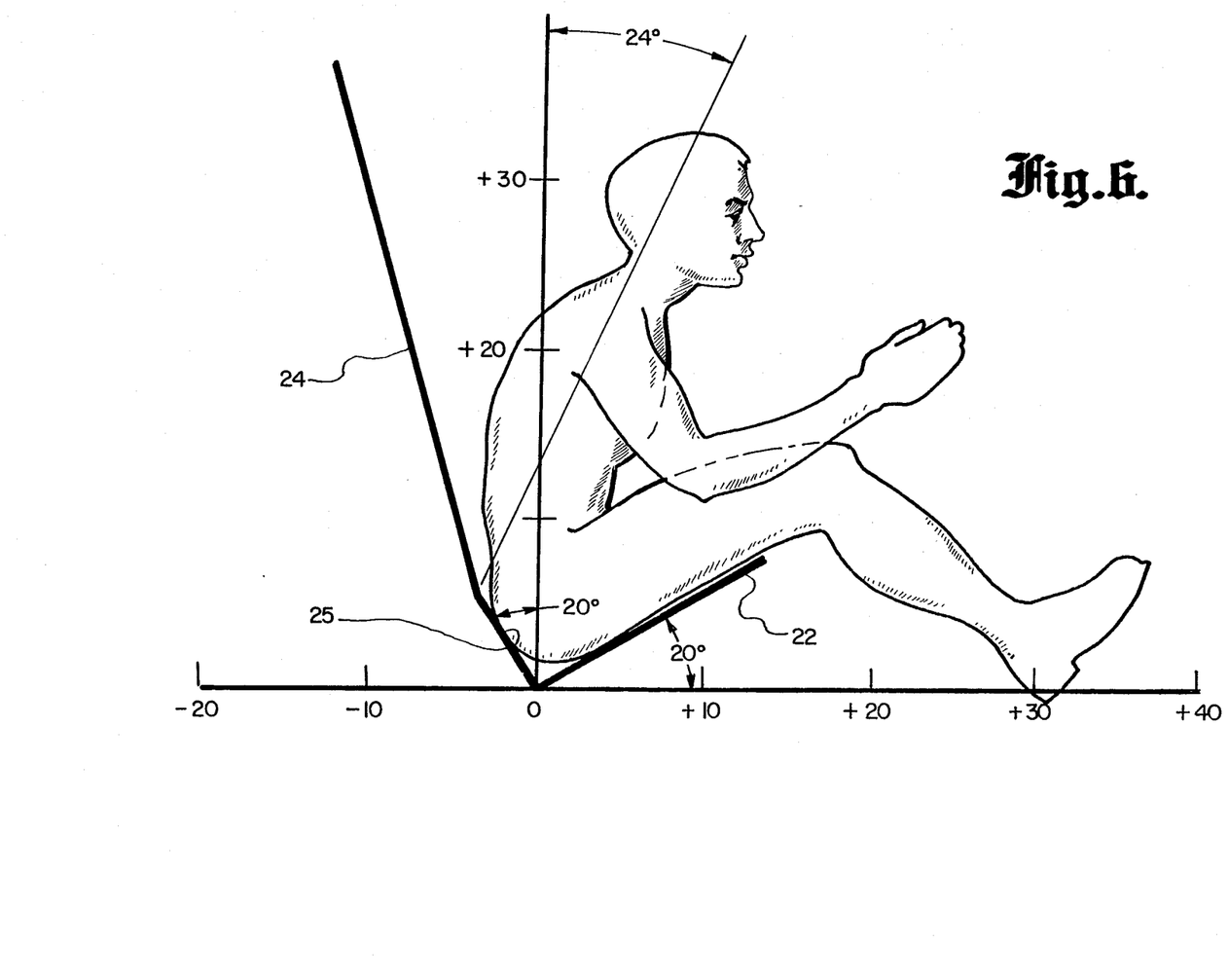
FIG. 6 is a diagrammatic view of the seat system of the present invention showing more accurately both the crouched position of the crewmember during high "g" aircraft maneuvers and the angular configuration of the seat parts.

A seat generally designated by the numeral 20 supports the crewmember in a desired crouched position providing improved protection from high "g" forces. The seat 20 comprises a seat pan 22 a seat pan base plate 23, a seat back 24 and a lower seat back 25. The seat pan 22 is rotatable relative to the seat back 24 about an axis 26 which is preferably located at approximately the connection between the seat pan 22 and the lower seat back 25. The position of the seat pan 22 is controlled automatically by means of a g-sensor 18 and a pneumatically inflatable bladder 16. The pneumatically inflatable bladder 16 under seat pan 22 is operably connected to the g-sensor 18 and moves the front portion of the seat pan up when inflated (by a suitable pressurizing means, not shown) preferably resulting in rotation of seat pan 22 about the axis 26. The weight of the crewmember's legs moves the front portion of the seat pan 22 down when bladder 16 is deflated. The seat pan 22 can thus rotate up in order to augment the angle of crouch of the crewmember. Thus, when the crewmember is subjected to very high "g" forces, the seat pan 22 rotates upward raising the crewmember's knees and augmenting the angle of crouch; this in effect improves the crewmember's protection from high "g" forces. In addition, when it is determined that the "g" forces will not be sufficiently high to warrant a position having a high degree of crouch, the seat pan 22 can be rotated downward thereby lowering the crewmember's legs and putting the crewmember in a less crouched and more comfortable position. Thus, the rotatable seat pan 22 allows the angle of crouch to be fine tuned to suit flight requirements or to accomodate the comfort preferences of the crewmembers. The range of the angle of crouch of the crewmember's upper torso is between approximately 0° to 45° fore the z axis of the aircraft. However, the preferred range is between approximately 15° to 35° and the preferred specific angle of crouch for the crewmember's upper torso is approximately 24° fore of the z axis of the aircraft (See FIG. 6).

It is preferable that the crewmember's legs be generally elevated during the application of high "g" forces. In this posture position, the crewmember's feet are preferably approximately level with his buttocks (See FIG. 6 where the crewmember's thigh are shown positioned at an angle of 20° relative to a horizontal axis). Elevating the crewmember's legs into this position tends to prevent blood from pooling in the lower extremities during the application of high "g" forces.

As previously stated in the foregoing, a crewmember can sustain higher "g" forces while in a crouched position than in an erect seated position, and the crouched position affords the crewmember better visibility than a prone position. Since the pilot's upper torso must be supported while in a crouched position in order to enhance tolerance to high "g" force loads, an upper torso support means, preferably in the form of a chest support 30, has been provided. The chest support 30 preferably includes a breast or front support plate 32 and a support member 34. The breast plate 32 is preferably padded or molded to conform to the contour of the crewmember's chest. When in a crouched position, the crewmember's chest is in contact with and braced against the breast plate 32 thereby transmitting the "g" load to the breast plate 32. The breast plate 32 is preferably pivotally mounted on the support member 34; the pivotal connection is preferably an appropriate U-joint connection 36. The U-joint connection 36 allows the breast plate 32 to pivot on the support member 34 and move relative thereto; this allows the crewmember a certain degree of movement relative to the support member thereby allowing him to more easily operate the controls, to bend forward and backward slightly and to turn to a limited degree in order to view enemy aircraft, environmental conditions or whatever else may be needed. The support member 34 is rigidly secured to the cockpit or preferably to the seat pan 22 as shown.

The support member is extendable preferably by incorporation therewith of a telescoping structure 35. This allows the crewmember whose suit 12 is integral with or secured to the support plate 32 to lean forward and backward from a crouched to a generally upright position. There is also a resilient means, preferably a spring 37, mounted in support member 34 and connected to U-joint 36 at a lower portion thereof. Spring 37 acts to support the crewmember in a desired crouched position. The application of high "g" forces tends to push the crewmember's upper torso against the compression force of the spring 37. Consequently, the higher the "g" forces, the greater the compression of spring 37 and the greater the resultant increase in the crewmember's angle of crouch.

Figure 7:
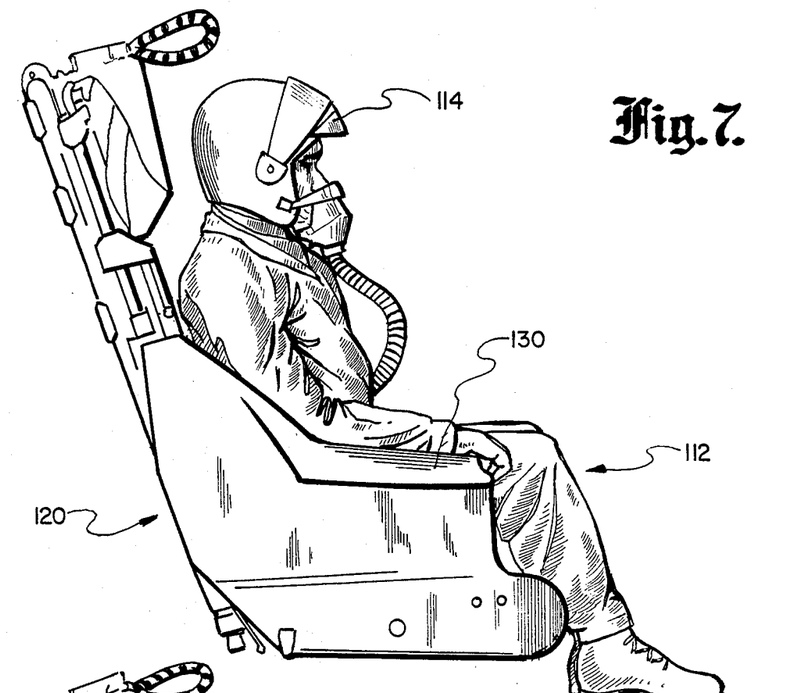
FIG. 7 is a side view of another embodiment of the present invention wherein the support means includes a pair of armrests.
Figure 8:
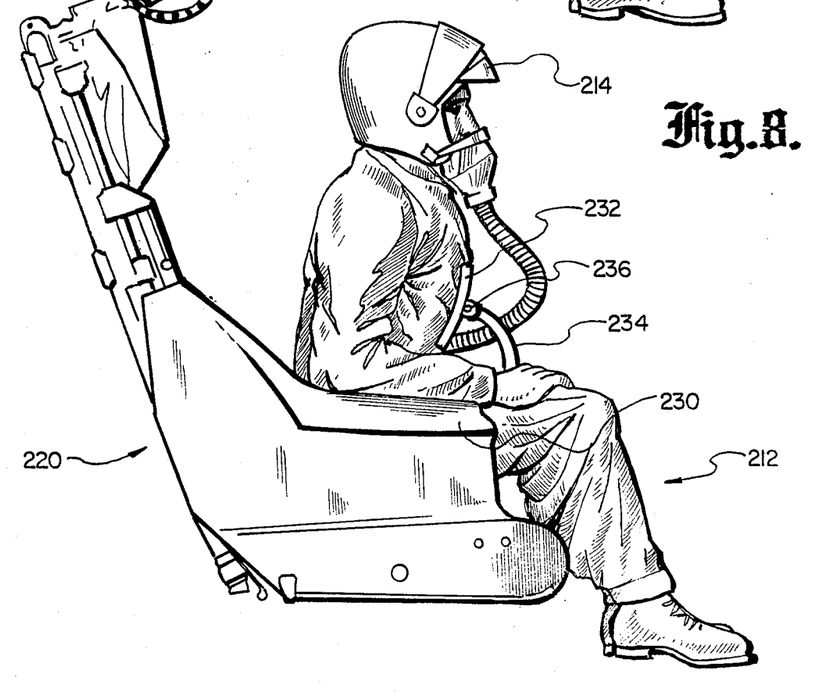
FIG. 8 is a side view of another embodiment of the present invention wherein the support means illustrated in FIG. 4 further includes a front rest.

Current fighter aircraft are structurally designed so as to be limited to withstand acceleration forces of approximately nine g's. Preliminary indications from centifuge tests conducted by Rockwell International Corporation in October 1985 indicate that leaning forward, without the added benefit of special garments or special structural members directly connected to and supporting the crewmember's upper torso, may provide the crewmember that degree of "g" protection. If so, then a support and restraint system which allows the pilot to lean forward from the waist during "g" maneuvering may be sufficient for use in present generation fighter aircraft. Therefore, in a second embodiment (FIG. 7) of the invention, specialized armrests 130 provide upper torso support to the crewmember in a forward posture. The armrests 130 are positioned so that when the crewmember is in the desired forward posture position the crewmember's elbows and upper torso center of gravity are in approximate alignment with the general direction of the acceleration forces; thus, upon the application of "g" forces, the crewmember can while in a crouched position rest his forearms on appropriately positioned armrests providing support thereby to his upper torso. Alternatively, a front rest 232 may be provided upon which the crewmember can lean his upper torso; the front rest 232 (FIG. 8) may be similar to chest support 30 except that it is not integral with or connected to the suit 12 and is not extendable. The front rest 232 may also be used in combination with the armrests 230 for enhanced "g" protection or to improve the crewmember's comfort when using the protection system. The structures 130, 230 and 232 are preferably integral with the seat, or they may be mounted directly on the airframe.

Figure 1:
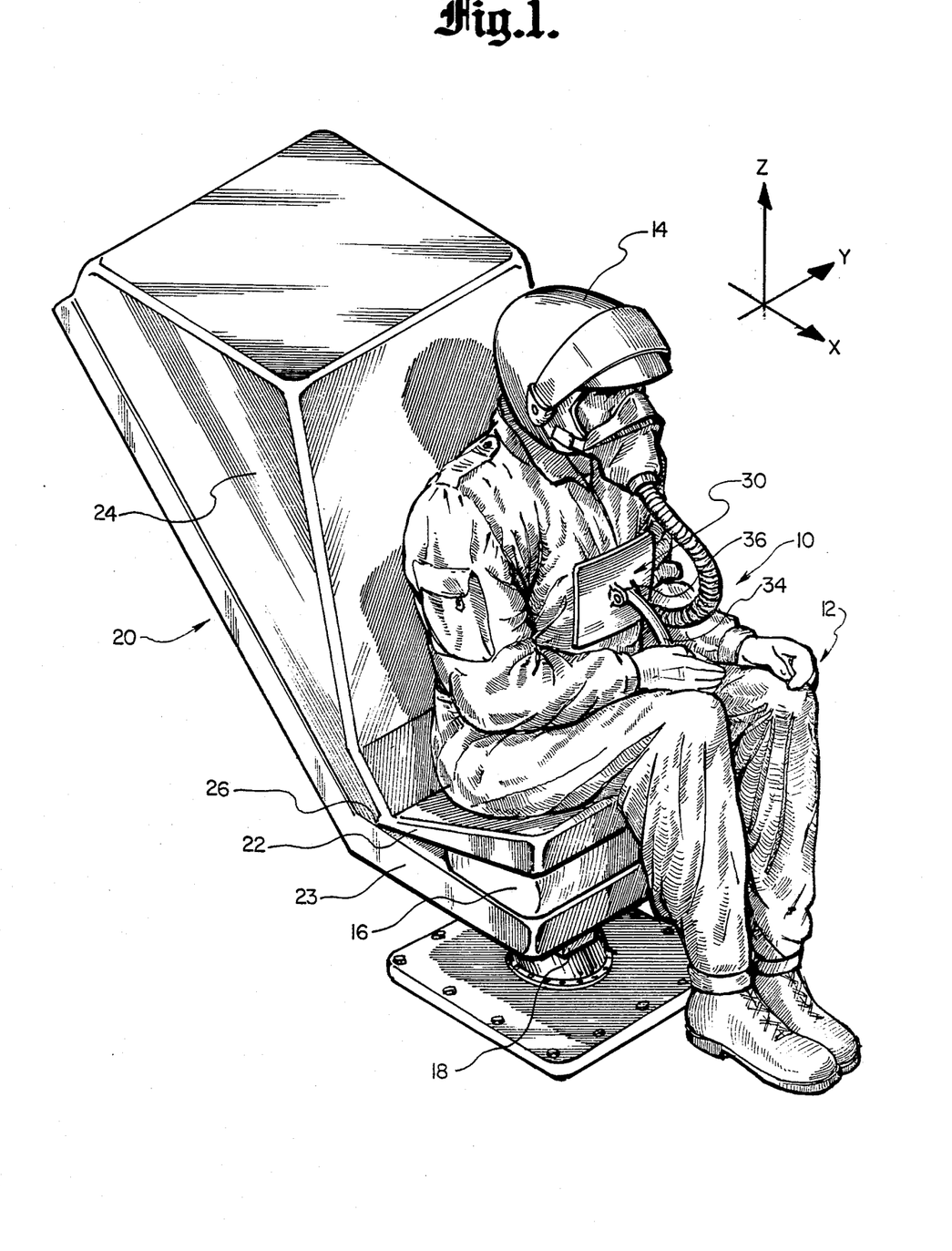
FIG. 1 is a perspective view of the high "g" protection system of the present invention showing the crewmember in a generally upright position in the seat.
Figure 2:
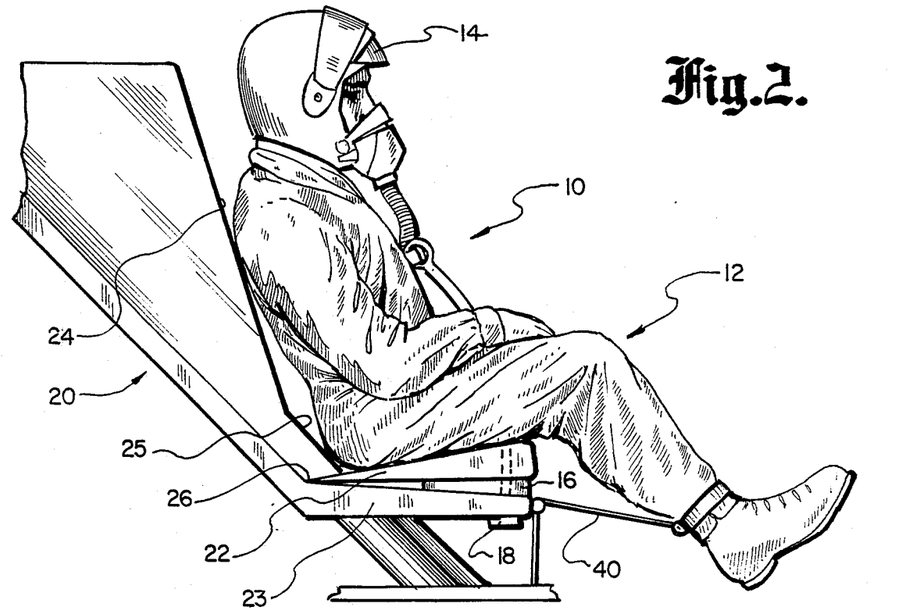
FIG. 2 is a side view of the high "g" protection system of the present invention showing the seat pan in a lowered position and illustrating the crewmember's ability to lean back in a comfortable resting position in the seat.
Figure 3:
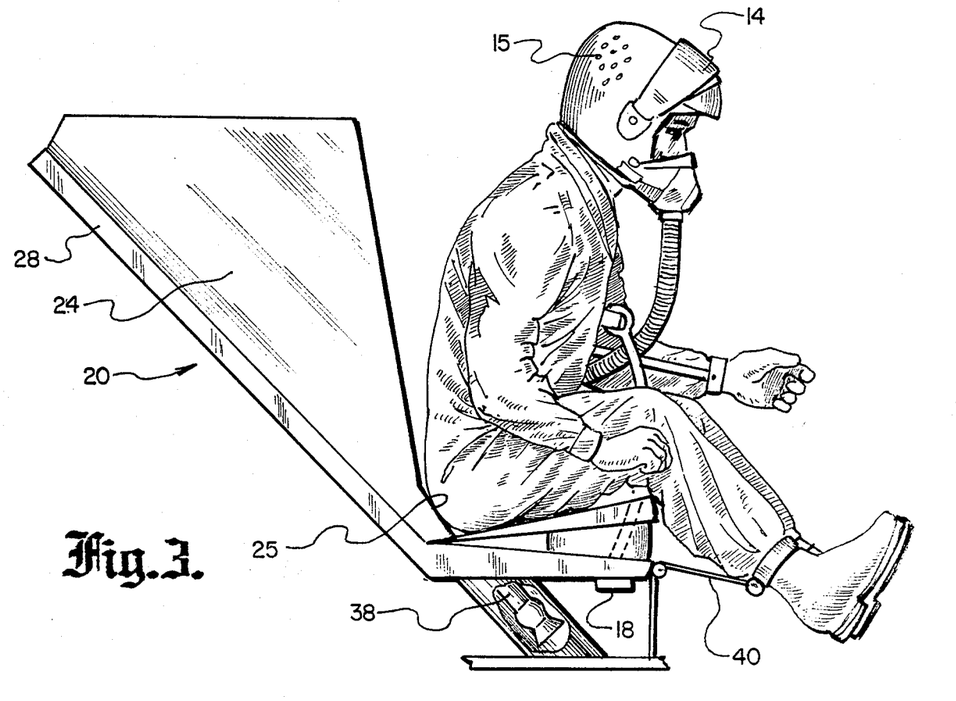
FIG. 3 is a side view of the system of the present invention showing the crewmember's ability to lean forward into a crouched position against the support means (with the crewmember's suit forming an integral part of the support means).
Figure 4:
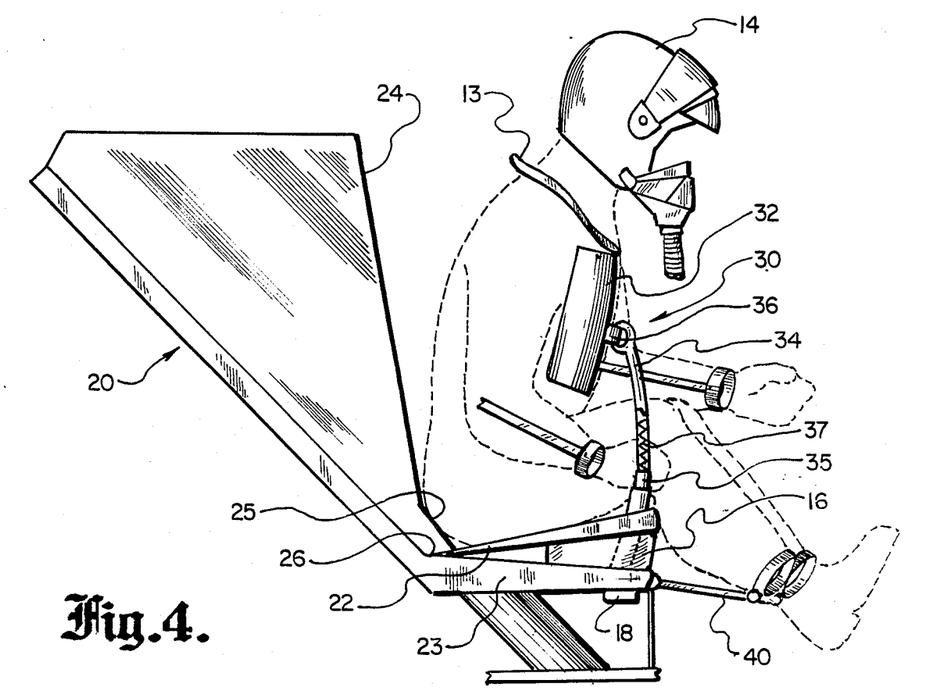
FIG. 4 is a side view showing the crewmember in phantom positioned for flight maneuvers and illustrating the seat system of FIGS. 1, 2, and 3 in more detail.

A rocket motor 38 (FIG. 3) mounted on the underside of seat pan 22 provides the propulsion necessary to eject the crewmember and seat 20 from the aircraft. The seat is provided with rails 28 which guide the seat out of the aircraft. The rails 28 are preferably inclined rearwardly. Although the rocket 38 and rail structure disclosed and shown in the drawings is the preferred ejection system, other suitable ejection systems may also be used in conjunction with the "g" protection system set forth therein.

Figure 5:
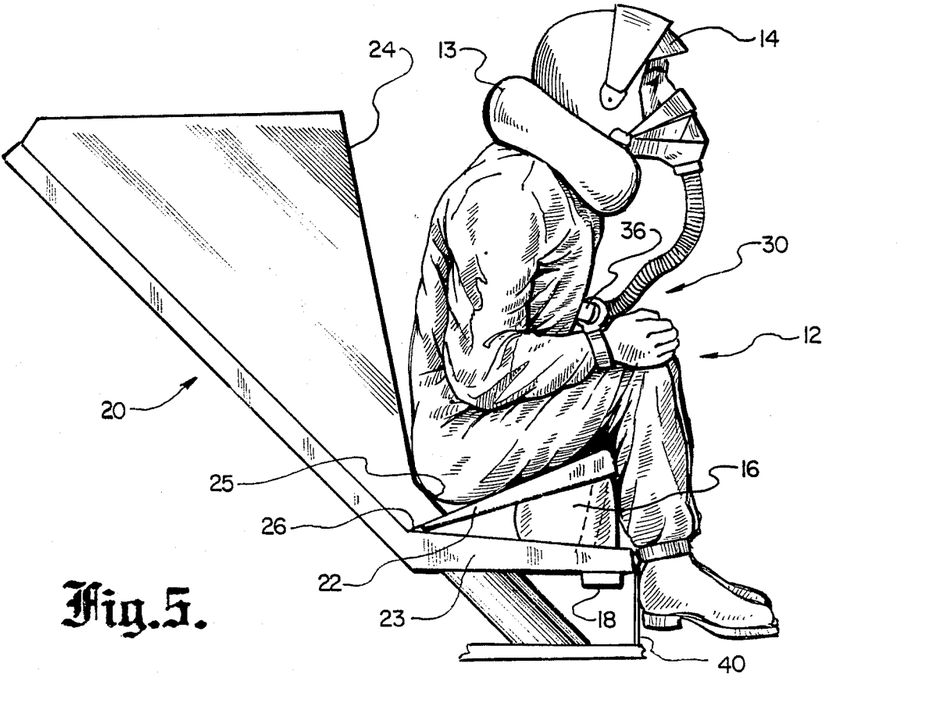
FIG. 5 is a side view of the system of FIGS. 1, 2, 3, and 4 illustrating the crewmember in an aircraft ejection position with a collar on the crewmember's flight suit inflated.

In order to prevent any of a crewmember's limbs from catching the windblast after ejection and imparting an angular momentum to the crewmember thereby resulting in a high speed spin thereof, it is necessary that the crewmember and seat be a more compact and drawn in unit. Consequently, it is desirable that the crewmember's legs be drawn in close to his torso with his feet tucked under his torso into a generally squatting position. In order to accomplish this, cords 40 connect the crewmember's lower legs to the aircraft and as shown in FIG. 5 during ejection drawn the crewmember's feet under his torso by movement of the seat away from the aircraft (a severing mechanism, not shown cuts cords 40 from the aircraft at this point, and a restraining means, not shown, holds the feet in the tucked in position during ejection). Alternatively, Shepherd's hooks (not shown) in lieu of cords 40, could be used to draw the crewmember's feet under his torso. The crewmember's arms may also be drawn in close to his chest during the ejection sequence by a suitable wrist strap system.

The crewmember is also provided with a helmet 14 which has perforations 15 in the shell. The perforations 15 allow release of air within the helmet 14 in order to reduce the pressure imbalance between the air stagnated inside the helmet 14 and the free stream air outside of the helmet during ejections. Without release of air pressure from the helmet after ejection from the aircraft, the air pressure in the helmet 14 might be sufficiently greater than the outside air pressure to literally tear the helmet from the crewmember's head.

The suit 12 is also provided with a collar 13 which is inflatable in order to provide firm support to the crewmember's head and neck and to keep his head and neck in a desired erect position upon ejection of the crewmember from the aircraft. The collar 13 is preferably automatically inflated by conventional means, not shown, in response to the forces of ejection of the crewmember from the aircraft.

Thus, it is apparent that there has been provided, in accordance with the invention, a high "g" protection system that fully satisfies the objectives, aims and advantages set forth above. While the invention has been described in conjunction with specific embodiments set forth above, it is evident that many alternatives, modifications and variations will be apparent in light of the foregoing description. Accordingly, it is intended to embrace all such alternatives, modifications and variations that fall within the spirit and scope of the appended claims.

I claim:

1. A high "g" protection system for the crewmember of an aircraft, comprising:
   a suit to be worn by the crewmember;
   a rigid support plate securely mounted on approximately a chest portion of said suit;
   a seat, said seat having a backrest and a seat pan rotatably connected to a lower portion thereof;
   a support member having a lower end secured to said seat and an upper end connected to said support plate by means of a U-joint, said U-joint allowing pivotal movement of the breast plate and said support member, said support member being extendable in order to provide support to the upper torso of the crewmember when in a forwardly crouched position and to allow the crewmember to be in a generally upright position;
   a spring mounted within said support member and connected to said U-joint, said spring exerting a force on said U-joint plate tending to support the crewmember in the desired forwardly crouched position, the magnitude of the force exerted on said plate being proportional to the angle of crouch to increase proportional to the magnitude of the "g" force exerted on the occupant;
   means for rotating the seat pan into a desired position in order to alter the angular position of the legs of the crewmember relative to the torso thereof;
   an inflatable collar secured to said suit; means for inflating said collar during the ejection of the crewmember in order to maintain the proper positioning of the head of the crewmember in relation to the torso and provide flotation to the crewmember in the event of water landing;
   means for disconnecting said support plate from said support member;
   a helmet to be worn by the crewmember, said helmet being perforated for emission of air therewithin in the event of an ejection in order to quickly equalize air pressure within said helmet with air pressure of the surrounding environment.

2. The system of claim 1, wherein the crouched position places the crewmember's upper torso at an angle inclined fore of the z axis of the aircraft, the angle being within the range of approximately 0° to 45°.

3. The system of claim 2 wherein the angle is approximately 24°.

4. A high "g" protection system for a crewmember of an aircraft, comprising:
   a seat; and
   support means for supporting the upper torso of said crewmember while seated in said seat in a forwardly crouched position, said support means allowing selective movement by the crewmember from a generally upright position in said seat to a forwardly crouched position under normal and high "g" flight conditions, said forwardly crouched position being within a range of angle of crouch of 15° to 45° fore the Z axis of the aircraft, said support means providing substantially greater support in the Z direction to the upper torso of said crewmember when in a forwardly crouched position then when in a generally upright position, said support means bearing against the chest of said crewmember when in a forwardly crouched position, said support means reducing spinal loads on the crewmember from "g" forces substantially in the Z axis of the aircraft when said crewmember is in a forwardly crouched position.

5. The system of claim 4 wherein said support means is connected to said seat.

6. The system of claim 4 also including a suit worn by the crewmember and wherein said support means includes a rigid support plate securely attached to the suit.

7. The system of claim 4 wherein said seat comprises a seat pan and a backrest, said seat pan connected to said backrest, at least a portion of said seat pan being rotatable relative to said backrest in order to raise the legs of the crewmember to enhance the "g" protection provided the crewmember while in said seat.

8. The system of claim 7 further including a rotating means for selectively effecting rotational movement of said seat pan.

9. The system of claim 8 wherein said rotating means includes:

a bladder positioned adjacent to the seat pan, said bladder mounted on an underside portion of said seat pan, said bladder being inflatable in order to raise at least a front portion of said seat pan in order to rotate said seat pan about the connection of said seat pan to said backrest; and inflating means for inflating said bladder.

10. The system of claim 9 further including a "g" sensor operably connected to said inflating means in order to cause said bladder to be inflated upon being subjected to acceleration forces exceeding a desired threshold magnitude.

11. The system of claim 6 wherein said rigid support plate forms a part of the crewmember's suit and also including a support member, said support plate pivotally connected to said support member in order to allow a limited range of rotatable movement of the upper torso of the crewmember.

12. The system of claim 4 wherein said support means is firmly secured to a structural member of the aircraft.

13. The system of claim 6 wherein said support means includes a support member, said support member pivotally connected to said support plate, said support member being extendable in order to allow selective movement of the crewmember between a forwardly crouched position and a generally upright position during flight of the aircraft as "g" forces warrant.

14. The system of claim 4 wherein said support means exerts a force on said crewmember which increases with increasing angle of forward crouch.

15. A high "g" protection system for crewmember of an aircraft, comprising:

a seat, said seat comprising a seat pan and a backrest, said seat pan connected to said backrest, at least a portion of said seat pan being rotatable relative to said backrest in order to raise the legs of the crewmember to enhance the "g" protection provided the crewmember while in said seat;

rotating means for selectively effecting rotational movement of said seat pan, said rotating means including a bladder positioned adjacent to the seat pan, said bladder mounted on an underside portion of said seat pan, said bladder being inflatable in order to raise at least a front portion of said seat pan in order to rotate said seat pan about the connection of said seat pan and said backrest, and also including inflating means for inflating said bladder;

support means for supporting the upper torso of said crewmember while seated in said seat in a forwardly crouched position, said support means reducing loads on the spine from "g" forces substantially in the Z axis of the aircraft.

16. The system of claim 15 also including a "g" sensor operably connected to said inflating means in order to cause said bladder to be inflated upon being subjected to acceleration forces exceeding a desired threshold magnitude.

* * * * *